US006686416B2

(12) United States Patent
Guse et al.

(10) Patent No.: US 6,686,416 B2
(45) Date of Patent: Feb. 3, 2004

(54) STORAGE-STABLE ISOCYANATE DISPERSIONS

(75) Inventors: Dieter Guse, Löhne (DE); Theodor Hippold, Bad Salzuflen (DE); Christian Terfloth, Detmold (DE)

(73) Assignee: Jowat Lobers und Frank GmbH & Co. KG, detmold (DE)

( * ) Notice: Subject to any disclaimer, the term of this patent is extended or adjusted under 35 U.S.C. 154(b) by 0 days.

(21) Appl. No.: 09/898,247

(22) Filed: Sep. 24, 2001

(65) Prior Publication Data

US 2002/0022680 A1 Feb. 21, 2002

(30) Foreign Application Priority Data

Jul. 15, 2000 (DE) .......................... 100 34 637

(51) Int. Cl.[7] .............. C08J 3/00; C08K 3/20; C08C 75/00
(52) U.S. Cl. .............. 524/591; 524/839; 524/840
(58) Field of Search .................. 524/591, 839, 524/840

(56) References Cited

U.S. PATENT DOCUMENTS

| 4,888,124 A | 12/1989 | Blum et al. .............. 252/182.2 |
| 5,191,012 A | * 3/1993 | Markusch et al. |

FOREIGN PATENT DOCUMENTS

| DE | 3228670 | 2/1984 |
| DE | 3517333 | 11/1986 |
| DE | 3930138 | 3/1991 |
| DE | 1013690 | 6/2000 |
| EP | 0 159 117 | 10/1985 |
| EP | 0 204 970 | 12/1986 |
| EP | 0 505 889 | 9/1992 |
| EP | 0 922 720 | 6/1999 |
| WO | WO 99/29755 | 6/1999 |
| WO | WO 99/58590 | 11/1999 |

* cited by examiner

Primary Examiner—Patrick D. Niland
(74) Attorney, Agent, or Firm—Cohen, Pontani, Lieberman & Pavane

(57) ABSTRACT

Disclosed is a storage-stable, essentially aqueous one component dispersion, of a deactivated isocyanate and a isocyanate-reactive polymer which cross-links at low temperatures.

40 Claims, 1 Drawing Sheet

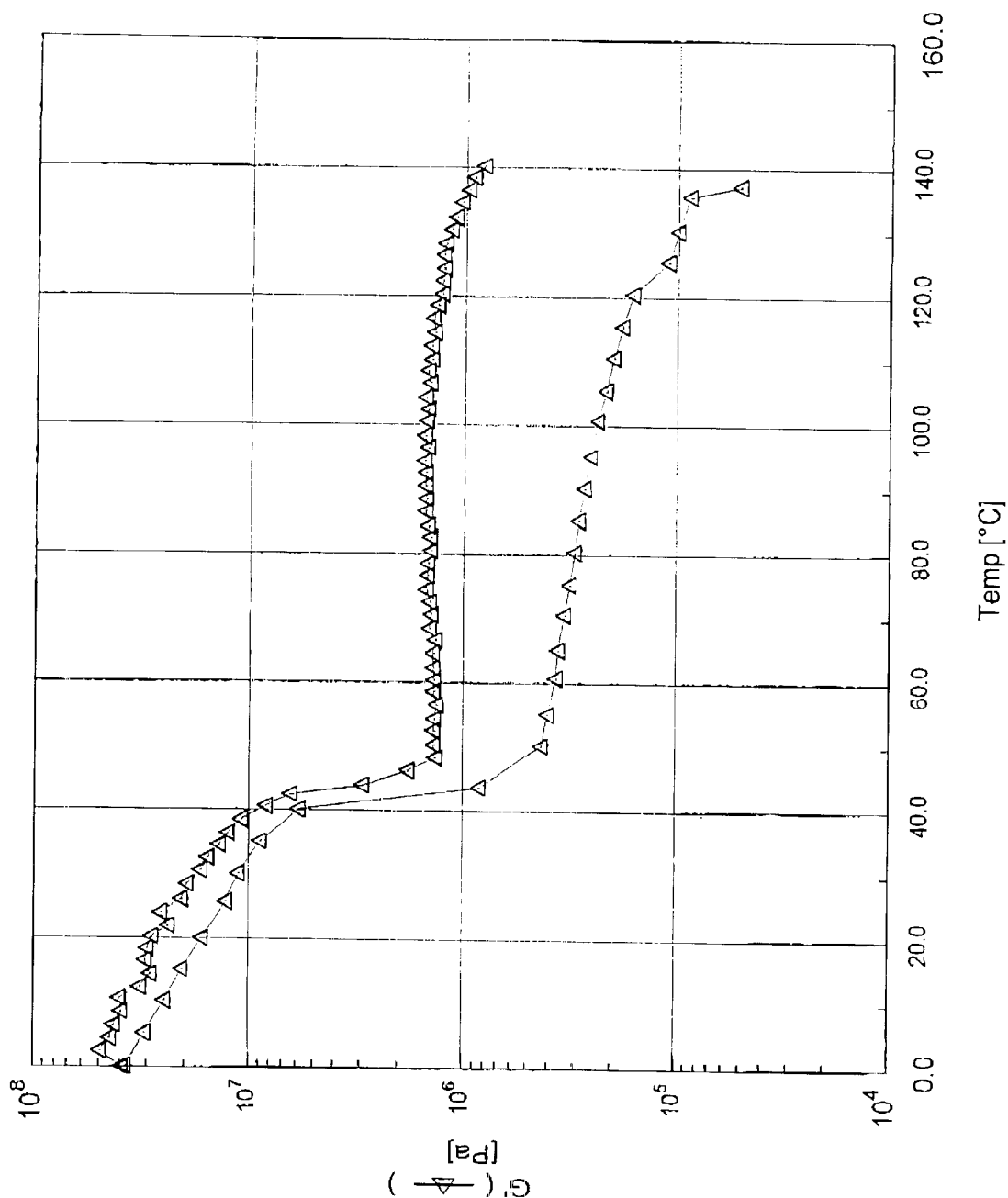

STORAGE-STABLE ISOCYANATE DISPERSIONS

BACKGROUND OF THE INVENTION

The present invention relates to storage-stable one-component dispersions comprising surface-deactivated isocyanates and isocyanate-reactive polymers, and to their preparation as well as to their use.

Nowadays, high-performance adhesive bondings are achieved according to the state of the art using reactive adhesives. A number of different adhesive systems are known for this purpose. Polyisocyanates are used for many applications in this field due to their high reactivity.

Depending on their respective application, a distinction is made between so-called two-component adhesive systems and one-component adhesive systems.

Two-component systems are mixed directly before application, wherein this requires an additional step for the user. In addition, dosage or mixing errors may occur during mixing of the two components.

In addition, there are one-component adhesive systems, such as, for example, isocyanate-terminated polymers which cross-link, after being applied, by reacting with moisture. The disadvantage with these systems is that hardening takes a long time since cross-linking depends on the rate of diffusion of the water. With very thick layers the cross-linking may also remain incomplete.

Stable one-component systems with chemically blocked isocyanates are also known which can be formulated by chemical blocking of the isocyanates with monofunctional reaction partners (e.g. EP 159 117). This blocking is thermally reversible so that under the effect of heat, the blocking agent is separated and the released isocyanate forms a thermostable bond with the reactive groups of the polymer by cross-linking. A disadvantage with these systems is that if the blocking agent is volatile at the temperatures of application, it vaporizes and may thus affect the environment or, if it remains in the adhesive, it may lead to degradation or deterioration with respect to the quality of the adhesive bond. In addition, such a system is not suitable for thermally sensitive substrates because the blocking agent must be separated under the effect of heat.

EP 0 204 970 A2 and U.S. Pat. No. 4,888,124 belonging to the same patent family disclose a method for producing stable dispersions of surface-deactivated or encapsulated solid polyisocyanates in a liquid by treatment of polyisocyanates with suitable deactivating agents. In order to disperse polyisocyanates, particularly solid polyisocyanates, so that they are storage-stable, and in order to prevent any premature, undesirable reaction with the medium, the dispersed isocyanates are deactivated at their surface with a suitable deactivating agent. The polyisocyanates are thus stabilized by applying a polymer shell to the surface of the polyisocyanate. The isocyanates treated in this way then have a so-called retarded reactivity. They are described synonymously as "encapsulated isocyanates", "surface-deactivated isocyanates" or only as "deactivated isocyanates".

The afore-mentioned patents EP 0 204 970 A2 and U.S. Pat. No. 4,888,124 also disclose the use of said dispersions of surface-deactivated solid polyisocyanates produced as cross-linking agents according to the method in these documents.

A disadvantage with the systems described in EP 0 204 970 A2 and U.S. Pat. No. 4,888,124 is that the breaking-up of the deactivating polymer shells, particularly polyurea capsules and thus the cross-linking reaction starts at temperatures between 70 and 180° C. Thus, such systems are not suitable for thermally sensitive substrates.

EP 0 505 889 A2 describes aqueous suspensions of encapsulated or surface-deactivated polyisocyanates in quantities of at least 12 wt. %, relative to the NCO content of the dispersion, wherein the encapsulation or surface deactivation of the polyisocyanate is brought about by allowing the dispersed polyisocyanates to react with polyamines having molecular weights below 400 in an equivalent ratio of amino groups to isocyanate groups ($N_{NH2}/N_{NCO}$) of at least 0.05:1.0, i.e. at least 5%. The dispersions described have a longer pot-life, but are not storage-stable since, as the Examples show, the isocyanate content decreases significantly after a few hours. The dispersions described are thus not suitable for being processed into films since they comprise no isocyanate-reactive components.

EP 0 922 720 A1 and the international patent application WO 99/29755 describe a method for producing storage-stable latent-reactive layers or powders of surface-deactivated solid polyisocyanates and isocyanate-reactive polymers with functional groups. The polyisocyanates in the Examples are deactivated with polyamines having high molecular weights. A disadvantage of the dispersions described is that they start to cross-link at higher temperatures so that they are not considered for methods performed or applied at room temperature or for the adhesion of temperature-sensitive substrates.

The international patent application WO 99/58590 originating from the applicants of the present application themselves describes a substance system in the form of a one-component dispersion which comprises deactivated isocyanates and cross-links already at low temperatures, particularly at temperatures below 70° C.

It is thus an object of the present invention to provide one-component dispersions which cross-link at lower temperatures.

It is also an object of the present invention to provide essentially aqueous one-component dispersions which, on the one hand, are storage-stable at room temperature in the dispersion state and, on the other hand, begin to cross-link during and/or after the removal of water (e.g. after application to a substrate).

In particular, an object of the present invention is to provide essentially aqueous one-component systems of surface-deactivated isocyanates and isocyanate-reactive polymers which may be stored in the dispersion state, but when applied as layers or films cross-link at low temperatures during and/or after removal of the water. Here, in particular, the substance system described in WO 99/58590 is to be developed further and optimized for its application.

BRIEF DESCRIPTION OF THE DRAWING

The FIGURE shows the DMA curve of two different polyurethane dispersions.

It has now been found in a surprising manner that the use of encapsulated or deactivated isocyanates, which are known per se, as cross-linking components in aqueous dispersions leads to storage-stable systems which, together with isocyanate-reactive components, cross-link at temperatures below 70° C. during and/or after removal of water (e.g. after application to a substrate).

Object of the present invention are thus cross-linkable, essentially aqueous (water-based) one-component dispersions, which are storage-stable at room temperature (20° C., 65% relative humidity), said one-component dispersions comprising:

(a) at least one surface-deactivated or encapsulated solid isocyanate which has been deactivated with a low-molecular deactivating agent having a molecular weight MW≦200 g/mol, wherein the deactivating agent comprises one or more primary and/or secondary amino groups and wherein for the degree of deactivation (DD), calculated as the equivalent ratio of amino groups to isocyanate groups ($N_{NH2}/N_{NCO}$), it holds that:

0.009:1.0<$DD$<0.05:1 (i.e.: 0.9%<$DD$<5%); and (b) at least one polymer reactive with isocyanate, so that films or layers formed from these dispersions are cross-linkable during and/or after the removal of water at temperatures between 5° C. and 40° C., particularly already at room temperature (20° C., 65% relative humidity).

The dispersions according to the present invention are adjusted in such a way that the films or layers formed from these dispersions begin to cross-link at the aforesaid temperatures during and/or after the removal of water and the solvent present, if necessary, in very small quantities. This means that during and/or after the removal of water, the reaction between the isocyanate groups of the deactivated isocyanate and the isocyanate-reactive groups of the polymer is induced or triggered so that the formation of a dense (compact, close) film takes place under the aforesaid conditions.

The dispersions according to the present invention are adjusted particularly by selecting the type and quantity of the solid isocyanate, by the type of surface deactivation (particularly type and quantity of deactivating agent) and also by selecting the type and quantity of the isocyanate-reactive polymers.

Applicants have now surprisingly found that such adjustment leads to dispersions having the desired properties particularly if a low-molecular mono-, di- or polyamine having one or more primary and/or secondary amino group(s) and having a molecular weight MW≦200 g/mol is used and if the degree of deactivation, calculated as the equivalent ratio of amino groups of the deactivating agent to isocyanate groups of the isocyanate to be deactivated ($N_{NH2}/N_{NCO}$), is selected in the following range:

0.009:1.0<$DD$<0.05:1, i.e. in the range between 0.9% and 5%.

The deactivation of the isocyanates is performed in a manner known per se (see particularly EP 0 204 970 A2 and U.S. Pat. No. 4,888,124). Surface deactivation, sometimes synonymously described in short merely as "deactivation" or "encapsulation", may be carried out in various ways, namely in particular:

(i) by dispersing a pulverulent (powdery) solid isocyanate in a solution of the deactivating agent;

(ii) by adding a melt of a low-melting isocyanate to a solution of the deactivating agent in a non-dissolving liquid dispersion medium;

(iii) by adding the deactivating agent or a solution of the deactivating agent to a dispersion of the solid and finely divided (particulate) isocyanate or vice versa.

Deactivation may be carried out in organic solvents and/or however also in water, wherein, if necessary, conventional additives familiar to the skilled practitioner such as dispersing agents, wetting agents (surface-active agents) or the like may be used. Methods (i) and (iii) are preferred according to the present invention, particularly method (iii).

For further details with respect to the deactivation of solid isocyanates, reference can be made to the already-cited EP 0 204 970 A2 and the corresponding U.S. Pat. No. 4,888,124, the contents of which are hereby fully incorporated by reference. Deactivating agents are also specified there; these particularly comprise compounds with hydrophilic groups such as in particular amino groups or hydroxyl groups which can react with the free isocyanate groups of the isocyanate and thereby form a surface shell on the isocyanates which initially deactivates the isocyanates such as, for example, amines, diamines and polyamines as wells as alcohols, dioles and polyoles.

As described above, a low-molecular mono-, di- or polyamine having one or more primary and/or secondary amino group(s) and having a molecular weight MW≦200 g/mol is used as the deactivating agent according to the present invention and in quantities such that the degree of deactivation (DD), calculated as the equivalent ratio of amino groups of the deactivating agent to isocyanate groups of the isocyanate to be deactivated ($N_{NH2}/N_{NCO}$), is between 0.9 and 5 equivalent %.

In particular, the deactivating agent may have a molecular weight MW≦180 g/mol, particularly≦160 g/mol, preferably ≦140 g/mol, more preferably≦120 g/mol.

Suitable deactivating agents according to the present invention, comprising primary and/or secondary amino groups are selected particularly from the group consisting of cyclic and aliphatic, straight-chain or branched ($C_2$–$C_{14}$) alkyl amines, diamines and polyamines, particularly ($C_2$–$C_{10}$)-alkyl amines, diamines and polyamines, preferably ($C_2$–$C_6$)-alkyl amines, diamines and polyamines, wherein the alkyl chain may be interrupted, at least partly or even completely, by hetero atoms, particularly oxygen or sulfur, and/or wherein the alkyl chain may comprise other substituents such as, for example, hydroxyl groups, carboxyl groups, halogen or similar.

The following compounds may be named as examples for suitable deactivating agents according to the present invention: 2-pentamethylene-1,5-diamine and its isomers and homologues such as, for example, 1,6-hexamethylene diamine; di-sec-butyl amine; ethylene diamine; 1,3-proplyene diamine; diethylene triamine; triethylene tetramine; 3,3'-dimethyl-4,4'-diaminodicyclohexyl methane; methylnonane diamine; isophorone diamine; 4,4'-diaminodicyclohexyl methane; alkanol amine and diamine as well as ethanol amine and diethanol amine. Particularly preferred among these are 2-pentamethylene-1,5-diamine and its isomers and homologues such as, for example, 1,6-hexamethylene diamine.

All diisocyanates and polyisocyanates solid at room temperature may be considered as isocyanates to be used according to the present invention. In particular, it is possible to use all diisocyanates or polyisocyanates or their mixtures which have a melting point above 40° C. and which may be converted by known methods to powder form having average particle sizes of less than 200 μm, preferably less than 100 μm. These may be aliphatic, cycloaliphatic, heterocyclic or aromatic diisocyanates or polyisocyanates.

The following isocyanates are specified as examples: 4,4'-methylene diphenylisocyanate (=diphenylmethane-4,4'-diisocyanate, MDI), toluylene diisocyanate-urethdione (=TDI-urethdione, TDI-U, dimeric 1-methyl-2,4-phenylene diisocyanate), TDI-urea, naphthalene-1,5-diisocyanate (NDI), 3,3'-dimethyl biphenyl-4,4'-diisocyanate (TODI) and the isocyanurate of IPDI (IPDI-T).

The preferred isocyanates according to the present invention are selected from the group consisting of 4,4'-methylene di(phenylisocyanate) (MDI), TDI-urethdione and TDI urea.

The deactivated isocyanates obtained are then combined with a suitable isocyanate-reactive polymer, e.g. while stirring. When the deactivated isocyanate has been incorporated homogeneously and smoothly, the one-component dispersions according to the present invention are ready for use.

The quantity of surface-deactivated or encapsulated isocyanates in the dispersions according to the present invention is generally, calculated as NCO content, 0.1 to 20 wt. %, particularly 0.1 to 10 wt. %, preferably 0.1 to 8 wt. %, more preferably 0.1 to 5 wt. %.

The polymer reactive with isocyanate generally consists of homopolymers, copolymers or their mixtures, which have isocyanate-reactive functional groups such as, for example, hydroxyl, amino, carboxyl, carbonamide etc. The isocyanate-reactive polymer is generally water-soluble or water-dispersable. For example, this may be a water-soluble or water-dispersible emulsion or dispersion homopolymer or copolymer.

The polymer reactive with isocyanate is particularly selected from the group consisting of polyurethanes, polyvinylacetates (PVAc), ethylenevinylacetates (EVA), polyamides and polyacrylates.

According to a special embodiment of the present invention, the polymer reactive with isocyanate is used in the form of an aqueous dispersion, i.e. by adding the aqueous polymer dispersion to the isocyanate dispersion or vice versa. The aqueous dispersion of the isocyanate-reactive polymer may be ionically stabilized, if necessary. Examples of such aqueous dispersions of isocyanate-reactive polymers are anionic or cationic dispersions comprising polyurethane, which may optionally carry carboxyl groups, hydroxyl groups, primary amino groups and/or secondary amino groups etc.

According to another embodiment of the present invention, the polymer reactive with isocyanate is a suitable dispersion adhesive, e.g. a polyurethane-based dispersion adhesive (such as Disperkoll® KA 8758, Bayer AG). This embodiment is particularly preferred if the dispersion according to the present invention is to be used as an adhesive.

The content of polymer reactive with isocyanate depends on the type of polymer and on the respective application. Generally, it is 1 to 75 wt. %, particularly 5 to 70 wt. %, preferably 5 to 50 wt. %, based on the total weight of the dispersion.

In addition, the one-component dispersions according to the present invention may comprise solvents and/or additional ingredients or additives. These additional ingredients or additives should be inert with respect to the other dispersion ingredients or constituents. The type and quantity of these additional ingredients or additives are familiar to the skilled practitioner. Examples of suitable ingredients or additives are particularly wetting agents (e.g. esters such as sodium sulfosuccinate, polyoxyethylene sorbitantrioleate etc.), defoaming agents or defoamers, organic or inorganic thickeners or thickening agents (polymer thickeners such as, for example, polyacrylic acid, cellulose, mineralic thickening agents such as laminated silicates etc.), softeners, fillers, plastic powder, pigments, dyes, light stabilizers, ageing stabilizers, corrosion inhibitors, fireproofing agents, propellants, resins, organofunctional silanes, catalysts, short-cut fibers, and, if necessary, small quantities of inert organic solvents.

The pH of the dispersions according to the present invention is generally in the range of 6 to 9. If necessary, adjustment may be made using suitable bases or acids.

The viscosity of the one-component dispersions according to the present invention remains constant at room temperature over a storage time of at least 3 months, preferably over a period of at least 6 months. This shows that the isocyanate content in the inventive dispersions remains constant in this time interval, i.e. in other words the inventive dispersions are storage-stable over this time interval. Storage-stable, in this context, means that the one-component systems of surface-deactivated isocyanates and isocyanate-reactive polymers may be stored in the dispersion state, i.e. in the dispersion state, the reactive groups of both components essentially do not react with one another and thus remain unreacted so that the capability to cross-link (cross-linkability) is retained in the dispersion state. After being applied as layers (films), however, the cross-linking reaction starts during and/or after the removal of water at low temperatures.

With the dispersions according to the present invention it is possible to apply layers which cross-link during and/or after evaporation of the water to form films. After the removal of water, the films formed from the dispersions according to the present invention and having layer thicknesses of 1000 $\mu$m exhibit a tear strength (tensile strength, tear resistance) of at least 10.5 N/mm$^2$ after storage for 4, 7, 14 and 28 days at room temperature. Object of the present invention are thus also cross-linked films and layers which are obtained from the inventive dispersions after removing water as well as the preparation of said films and layers. The films generally exhibit a high heat-stability and an increased chemical resistance.

The minimum film formation temperature (MFT) of the dispersions according to the present invention lies below the cross-linking temperature, particularly below 40° C. The minimum film formation temperature gives the temperature above which a dispersion forms a dense (compact, close) film and is defined according to DIN 53787:1974-02.

Without being bound to a specific theory, the cross-linking during and/or after the removal of water could be explained by the fact that the autohesion forces arising during the film formation mechanically destroy or break up the encapsulating polymer shells of the isocyanates, which results in a cross-linking reaction which is detectable by the increase in the film cohesion and the reduction in the film expansion, respectively.

An object of the present invention is also a method for preparing the dispersions according to the present invention. This method generally comprises the following steps:

preparing a dispersion of the isocyanates as described above, using conventional dispersing methods;

surface deactivation of the isocyanates within the dispersion according to the methods described above, wherein a low-molecular deactivating agent comprising one or more primary and/or secondary amino groups and having a molecular weight of 200 g/mol or less is used for surface deactivation and wherein the degree of deactivation (DD), calculated as the equivalent ratio of amino groups to isocyanate groups, is adjusted such that: 0.009:1.0<DD<0.05:1.0; and combining the dispersion of the surface-deactivated isocyanate thus prepared with an isocyanate-reactive polymer as defined above.

The one-component dispersions according to the present invention may be used in numerous ways, e.g. as a varnish (lacquer), a coating, a sealant, a casting (pouring) material and/or as an adhesive. Object of the present invention are thus also varnishes (lacquers), coatings, sealants, casting (pouring) materials and/or adhesives which comprise the one-component dispersions according to the present invention.

As mentioned above, when the dispersions according to the present invention are used as an adhesive, a suitable dispersion adhesive, particularly a polyurethane-based dispersion adhesive (e.g. Dispercoll® KA 8758), may be added to the dispersions as isocyanate-reactive polymer.

The one-component dispersions according to the present invention have the advantage that they cross-link at relatively low temperatures, particularly at room temperature, thus avoiding the disadvantages of the state of the art.

As described above, the desired properties of the inventive dispersions may be obtained by correctly adjusting and matching the dispersion parameters, particularly by selecting an appropriate solid isocyanate, by selecting an appropriate deactivating agent, by adjusting the degree of deactivation (equivalent ratio $N_{NH2}/N_{NCO}$) and by selecting the appropriate isocyanate-reactive polymer.

Compared to known two-component systems, the inventive one-component dispersions have the advantage that the user cannot make processing errors, e.g. dosage or mixing errors.

As described above, the dispersions according to the present invention may also be used, for example, as adhesives or constituents of adhesives. An object of the present invention is also an adhesion method, particularly under pressure (compression), using dispersions according to the present invention. This adhesion method generally comprises the following steps:

Applying to a substrate a homogeneous layer of dispersions according to the present invention with the desired layer thickness, wherein applying may be carried out by using conventional methods (e.g. spreading, coating with a knife or blade, spraying, dipping etc.);

Removing the water or drying the applied layer, if necessary under short-time heating, wherein the reactive groups essentially remain unreacted in the drying process so that the cross-linkability of the applied layer is retained;

Assembling (joining together) the substrate treated in this way with a second substrate to be adhered, particularly a thermoplastic substrate, in order to form a bond;

Short-time heating of the bond thus obtained under pressure, preferably compression, so that the applied and dried layer formed from the dispersion is made tacky (sticky, adhesive), wherein in general temperatures above the softening point of the substrate to be adhered, particularly a thermoplastic substrate, and/or above the softening point of the isocyanate-reactive polymer are applied; and Cooling the bond (assembly) to ambient temperature.

After cooling the bond (assembly) to ambient temperature, an essentially complete cross-linking of the adhesive film occurs during the subsequent storage as a result of the cross-linkability of the inventive dispersions at low temperatures.

Such an adhesion method is suitable, for example, for the adhesion of temperature-sensitive and/or thermoplastic substrates such as, for example, PVC. Wood, metal or plastic, for example, may be used as suitable substrate materials.

The one-component dispersions according to the present invention may be used, for example, in an advantageous manner for the adhesion of three-dimensionally shaped furniture fronts. Such furniture fronts are manufactured nowadays as follows: A contoured MDF substrate (MDF= medium density fiberboard) is compressed with a plastic film (foil) under pressure and while applying heat such that the film adapts to the contours of the MDF surface predefined by the substrate.

The frictional bonding (friction-type bond) between the two substrates requires an adhesive which has been previously applied to the substrate.

It is known from the state of the art that two-component polyurethane dispersion systems are used to achieve high-performance bonding with good thermal stability, wherein the aqueous dispersion is mixed vigorously with the liquid polyisocyanate which emulsifies in water directly before use. However, as a result of dosage errors or insufficient mixing of the components, the optimal thermal stabilities may not be achieved. In addition, the processing time for these two-component systems is limited to only a few hours by the pot-life.

These disadvantages can, however, be avoided in an advantageous manner by the one-component dispersion adhesive according to the present invention.

Other embodiments, developments and variations of the present invention are readily familiar to the skilled practitioner without him hereby leaving the present invention.

The present invention is illustrated by the following Examples, which are, however, in no way limiting.

Example 1

Preparation of the Deactivated Isocyanate

Example 1.1

Surface Deactivation of TDI Urethdione in the Organic Phase 100 ml cyclohexane are placed in a beaker and 20 mg TDI urethdione (Desmodur TT®, Bayer AG) are suspended, stirring vigorously. A solution of 0.26 g methylpentamethylene diamine (Dytek A®, DuPont) in 50 ml cyclohexane are then added. After a stirring time of two hours, the solution is free of solvent, so that a finely divided white powder is obtained.

Surface-deactivated TDI urethdione is obtained having a degree of deactivation, calculated as the equivalent ratio of amino groups to isocyanate groups ($N_{NH2}/N_{NCO}$), of approximately 0.04:1, i.e. of approximately 4%.

Example 1.2

Surface Deactivation of TDI Urea in the Organic Phase

The method of preparation corresponds to that in Example 1.1, whereas a TDI urea (Desmodur LS 2116®, Bayer AG) is used instead of the TDI urethdione.

Example 1.3

Surface Deactivation of TDI Urethdione in the Aqueous Phase 0.56 kg methylpentamethylene diamine are added to 58 l of water and, if necessary, after adding conventional dispersing agents, 41.2 kg TDI urethdione are added while stirring, until a homogeneous aqueous paste of deactivated TDI urethdione is produced.

Surface-deactivated TDI urethdione is obtained having a degree of deactivation, calculated as the equivalent ratio of amino groups to isocyanate groups ($N_{NH2}/N_{NCO}$), of approximately 0.04:1, i.e. of approximately 4%.

Example 2

Preparation and Comparison of One-Component Dispersion Adhesives

The deactivated isocyanates from Examples 1.1, 1.2 and 1.3 are added to an tonically stabilized 40% polyurethane dispersion (Dispercoll® KA 8758) while stirring. Mixing is performed until the isocyanates are incorporated homogeneously and smoothly. As a result, storage-stable one-component dispersion adhesives according to the present invention are obtained, comprising deactivated TDI urethdione or deactivated TDI urea and polyurethane as isocyanate-reactive polymer.

The cross-linking of the storage-stable one-component dispersion adhesives at room temperature is illustrated using the following Examples:

Comparative Example

A thermoplastic one-component dispersion (polyurethane dispersion) without any addition of deactivated (encapsulated) isocyanate:

100 g Dispercoll® KA 8758, Bayer AG (40% ionically stabilized polyurethane dispersion).

Example 2.1

A cross-linkable one-component dispersion according to the present invention comprising polyurethane (Dispercoll® KA 8758) and deactivated isocyanates:

100 mg Dispercoll® KA 8758 and 4 g deactivated isocyanate according to Example 1.1 are mixed together homogeneously. A dispersion according to the present invention is obtained.

Example 2.2

A cross-linkable one-component dispersion according to the present invention comprising polyurethane (Dispercoll® KA 8758) and deactivated isocyanates:

100 mg Dispercoll® KA 8758 and 4 g deactivated isocyanate according to Example 1.2 are mixed together homogeneously. A dispersion according to the present invention is obtained.

Example 2.3

A cross-linkable one-component dispersion according to the present invention comprising polyurethane (Dispercoll® KA 8758) and deactivated isocyanates:

100 mg Dispercoll® KA 8758 and 4 g deactivated isocyanate according to Example 1.3 are mixed together homogeneously. A dispersion according to the present invention is obtained.

Determination of Tearing Strength

Using the dispersions from the Comparative Example and Examples 1.1, 1.2 and 1.3, 1000 µm thick films are applied using a blade (knife), dried (20° C./65% relative humidity) and stored and cross-linked under these conditions. The tear strength (tensile strength, tear resistance) of the film cross-linked in this manner was determined using a tensile testing machine after various storage times (4, 7, 14 and 28 days).

The tear strength of the films originating from the dispersion of the Comparative Example after storage for 4, 7, 14 or 28 days at room temperature is between 6.5 and 7.3 N/mm$^2$.

On the other hand, the tear strength of the films produced using the dispersions of Examples 2.1, 2.2 and 2.3 according to the present invention are above 10.5 N/mm$^2$ in each case and thus significantly higher than the tearing strengths of the films according to the Comparative Example.

The viscosity of the one-component dispersion adhesives prepared according to Examples 2.1, 2.2 and 2.3 remained constant over a storage time of 3 months at room temperature.

Determination of the Storage Modulus G'

The only figure shows the DMA curve of two different polyurethane dispersions. The storage modulus G' as a function of temperature is plotted. The red, upper curve shows the temperature-dependent behavior of the storage modulus G' for a dispersion of deactivated polyisocyanates and polyurethane according to the present invention. The blue, lower curve, on the other hand, shows the behavior of the storage modulus G' for the comparative system, a pure polyurethane dispersion (Comparative Example). The two samples had been stored as films at room temperature for 2 weeks in each case. The graph clearly shows that the system according to the present invention after cross-linking at room temperature has a higher storage modulus G', i.e. higher cohesion, over the entire temperature profile.

Example 3

Preparation of a One-Component Dispersion Adhesive According to the Present Invention After optionally adding known surfactants, 8.8 kg of the surface-deactivated TDI urethdione prepared in Example 1.3 are added to 77 kg of polyurethane dispersion (Dispercoll® U 53, Bayer AG, 40% dispersion) and the viscosity is adjusted according to the application by adding conventional thickeners.

A dispersion according to the present invention is obtained, comprising the deactivated TDI urethdione and polyurethane as isocyanate-reactive polymer. This dispersion may be used as a dispersion adhesive.

The viscosity of the dispersion according to the present invention remains constant for 3 months, which shows that the isocyanate content of the dispersion remains unchanged for 3 months, i.e. the dispersion is storage-stable for 3 months.

Example 4

Preparation of a One-Component Dispersion Adhesive According to the Present Invention The same procedure is followed as under Example 3, but the TDI urethdione prepared in Example 1.1 is used instead of the TDI urethdione prepared in Example 1.3.

A dispersion according to the present invention is obtained, comprising the deactivated TDI urethdione and polyurethane as isocyanate-reactive polymer. This dispersion may be used as a dispersion adhesive.

The viscosity of the dispersion according to the present invention remains constant for 3 months, which shows that the isocyanate content of the dispersion remains unchanged for 3 months, i.e. the dispersion is storage-stable for 3 months.

The terms and expressions which have been employed are used as terms of description and not of limitation, and there is no intention in the use of such terms and expressions of excluding any equivalents of the features shown and described or portions thereof, it being recognized that various modifications are possible within the scope of the invention.

What is claimed is:

1. An aqueous one component dispersion comprising:
   (a) at least one surface-deactivated or encapsulated solid isocyanate wherein the deactivating agent comprises one or more primary and/or secondary amino groups and wherein the degree of deactivation, calculated as the equivalent ratio of amino groups to isocyanate groups, is between 0.009:1.0 and 0.05:1.0; and (b) at least one polymer reactive with isocyanate.

2. An essentially aqueous one component dispersion, storage-stable at room temperature, comprising:

(a) 0.1 to 10 wt. % calculated as NCO content, of at least one surface-deactivated or encapsulated solid isocyanate which was been deactivated with a low-molecular deactivating agent having a molecular weight of less than, or equal to, 200 g/mol wherein the deactivating agent comprises one or more primary and/or secondary amino groups and wherein the degree of deactivation DD, calculated as the equivalent ratio of amino groups to isocyanate groups $N_{NH2}/N_{NCO}$, is in a range of $$0.009:1 < DD < 0.05:1.0;$$

(b) 5 to 75 wt. %, based on the total weight of the dispersion, of at least one polymer reactive with isocyanate, wherein a film or layer formed from the dispersion is cross-linkable during and/or after the removal of water at a temperature of from 5° C. to 40° C.

3. The one component dispersion of claim 2, wherein the isocyanate is selected from the group consisting of toluylene diisocyanate urethdione (TDI urethdione), toluylene diisocyanate urea (TDI urea) and 4,4'-methylene-diphenylisocyanate (MDI).

4. The one component dispersion of claim 2, wherein the surface-deactivated or encapsulated isocyanate in the dispersion, calculated as NCO content, is present in an amount of 0.1 to 8 wt. %.

5. The one component dispersion of claim 4 wherein
a) the alkyl amines, diamines and polyamines are ($C_2$–$C_{10}$)-alkyl amines, diamines and polyamines; and/or
b) the hetero atoms are oxygen and/or sulfur; and/or
c) the other substituents are hydroxyl groups, carboxyl groups or halogen.

6. The one component dispersion of claim 5 wherein the amines are ($C_2$–$C_6$) alkyl amines, diamines and polyamines.

7. The one component dispersion of claim 2, wherein the deactivating agent has a molecular weight of no greater than 180 g/mol.

8. The one-component dispersion of claim 2, wherein the deactivating agent is selected from the group consisting of cyclic or aliphatic, straight-chain or branched ($C_2$–$C_{14}$)-alkyl amines, diamines and polyamines, wherein the alkyl chain may be interrupted, at least partly or even completely, by hetero atoms, and/or wherein the alkyl chain comprises other substituents.

9. The one component dispersion of claim 2, wherein the polymer reactive with isocyanate comprises a homopolymer, a copolymer or mixtures thereof, which have isocyanate-reactive functional groups.

10. The one component dispersion of claim 2, wherein the polymer reactive with isocyanate is selected from the group consisting of polyurethane, polyvinyl acetate (PVAc), ethylenevinyl acetate (EVA), polyamide and polyacrylate.

11. The one component dispersion of claim 2, wherein the polymer reactive with isocyanate is used as an aqueous dispersion which may optionally be ionically stabilized.

12. The one component dispersion of claim 11, wherein the polymer reactive with isocyanate is an anionic or cationic dispersion which comprises polyurethane optionally substituted with carboxyl groups, hydroxyl groups, primary amino groups and/or secondary amino groups.

13. The one component dispersion of claim 2, wherein the polymer reactive with isocyanate is a suitable dispersion adhesive.

14. The one component dispersion of claim 13, wherein the dispersion adhesive is a polyurethane-based dispersion adhesive.

15. The one component dispersion of claim 2, wherein the polymer reactive with isocyanate in the dispersion is present in an amount of 5 to 75 wt. %, based on the total weight of the dispersion.

16. The one component dispersion of claim 15 wherein the amount is 5 to 70 wt. %.

17. The one component dispersion of claim 15 wherein the amount is 5 to 50 wt. %.

18. The one component dispersion of claim 2, wherein the dispersion has a viscosity at room temperature essentially constant over a storage time of at least 3 months to 6 months.

19. The one component dispersion of claim 2, further comprising additional ingredients, additives and/or solvents.

20. A film or layer formed from the one component dispersion of claim 2, wherein said film or layer has a layer thickness of about a 1000 µm, and a tear strength of at least 10.5 N/mm$^2$ after storage for 4, 7, 14 and 28 days at room temperature.

21. The film or layer of claim 20 wherein said film or layer formed from the dispersion is cross-linkable during and/or after the removal of water at a temperature of from 5° C. to 40° C.

22. The one component dispersion of claim 21, wherein the polymer reactive with isocyanate is in the form of an aqueous dispersion optionally ionically stabilized.

23. The one component dispersion of claim 21, wherein the polymer reactive with isocyanate is a suitable dispersion adhesive.

24. The one component dispersion of claim 23 wherein the adhesive is a polyurethane-based dispersion adhesive.

25. An adhesive, coating, sealant, casting (pouring) material or varnish (lacquer) comprising the one component dispersion of claim 21.

26. The film or layer of claim 25, wherein the film or layer undergoes cross-linking during and/or after removal of the water at a temperature of from 5° C. to 40° C.

27. A film or layer formed from the one component dispersion of claim 21.

28. The film or layer of claim 27, wherein said film has a layer thickness of about a 1000 µm and a tear strength of at least 10.5 N/mm$^2$ after storage for 4, 7, 14 and 28 days at room temperature.

29. The film or layer of claim 20 wherein the water is removed at a temperature of about 20° C. at a relative humidity of about 65%.

30. An adhesive, a coating, a sealant, a casting (pouring) material or a varnish (laquer) comprising the one component dispersion of claim 2.

31. A method for preparing a dispersion of claim 2, comprising:

a) preparing a dispersion of an isocyanate, said isocyanate selected from the group consisting of toluylene diisocyanate urethdione (TDI urethdione), toluylene diisocyanate urea (TDI urea) and 4,4'-methylene di(phenyl isocyanate) (MDI);

b) deactivating the surface of the isocyanate in the dispersion, wherein a low-molecular deactivating agent comprising one or more primary and/or secondary amino groups and having a molecular weight of 200 g/mol or less is used for surface deactivation and wherein the degree of deactivation (DD), calculated as the equivalent ratio of amino groups to isocyanate groups, is adjusted such that 0.009:1.0<DD<0.05:1.0; and c) combining the dispersion of the surface-deactivated isocyanate with an isocyanate-reactive polymer.

32. An adhesion method, optimally under compression, comprising:

a) applying to a first substrate a homogeneous layer of the dispersion of claim 2 having a desired layer thickness;

b) drying the applied layer, wherein the reactive groups essentially remain unreacted during the drying process;

c) joining the first substrate with a second substrate to be adhered, particularly a thermoplastic substrate, to form a bond;

d) heating the bond thus obtained under pressure, preferably compression, so that the applied and dried layer of the dispersion is rendered tacky, at a temperature above the softening temperature of the substrate to be adhered, particularly a thermoplastic substrate, and/or above the softening temperature of the isocyanate-reactive polymer; and e) optionally cooling the bond to ambient temperature.

33. The adhesion method of claim 32 wherein the drying of the layer is performed by heating.

34. The one component dispersion of claim 2 wherein the temperature is about 20° C. at a relative humidity of about 65%.

35. The one component dispersion of claim 2 wherein the surface deactivated or encapsulated isocyanate in the dispersion, calculated as NCO content, is present in an amount of 0.1 to 5 wt. %.

36. The one component dispersion of claim 2 wherein the deactivating agent has a molecular weight of no greater than 160 g/mol.

37. The one component dispersion of claim 2 wherein the deactivating agent has a molecular weight of us no greater than 140 g/mol.

38. The one component dispersion of claim 2 wherein the deactivating agent has a molecular weight of us no greater than 120 g/mol.

39. An essentially aqueous one component dispersion, storage-stable at room temperature, comprising:

(a) 0.1 to 10 wt. % calculated as NCO content, of at least one surface-deactivated or encapsulated solid isocyanate, said isocyanate selected from the group consisting of toluylene diisocyanate urethdione (TDI urethdione), toluylene diisocyanate urea (TDI urea) and 4,4'-methylene di(phenyl isocyanate) (MD) and deactivated with a low-molecular deactivating agent having a molecular weight of less than, or equal to, 200 g/mol, wherein the deactivating agent comprises one or more primary and/or secondary amino groups and wherein the degree of deactivation DD, calculated as the equivalent ratio of amino groups to isocyanate groups $N_{NH2}/N_{NCO}$, is in a range of $$0.009:1.0<DD<0.05:1.0;$$

(b) 5 to 75 wt. %, based on the total weight of the dispersion, of at least one polymer reactive with isocyanate, said polymer selected from the group consisting of homopolymers, copolymyers or their mixtures which have isocyante-reactive functional groups.

40. The one component dispersion of claim 39 wherein the homopolymers, copolymers or their mixtures are selected from the group consisting of polyurethanes, polyvinylacetates (PVAc), ethylene-vinylacetates (EVA), polyamides and polyacrylates.

* * * * *